United States Patent Office 3,108,076
Patented Oct. 22, 1963

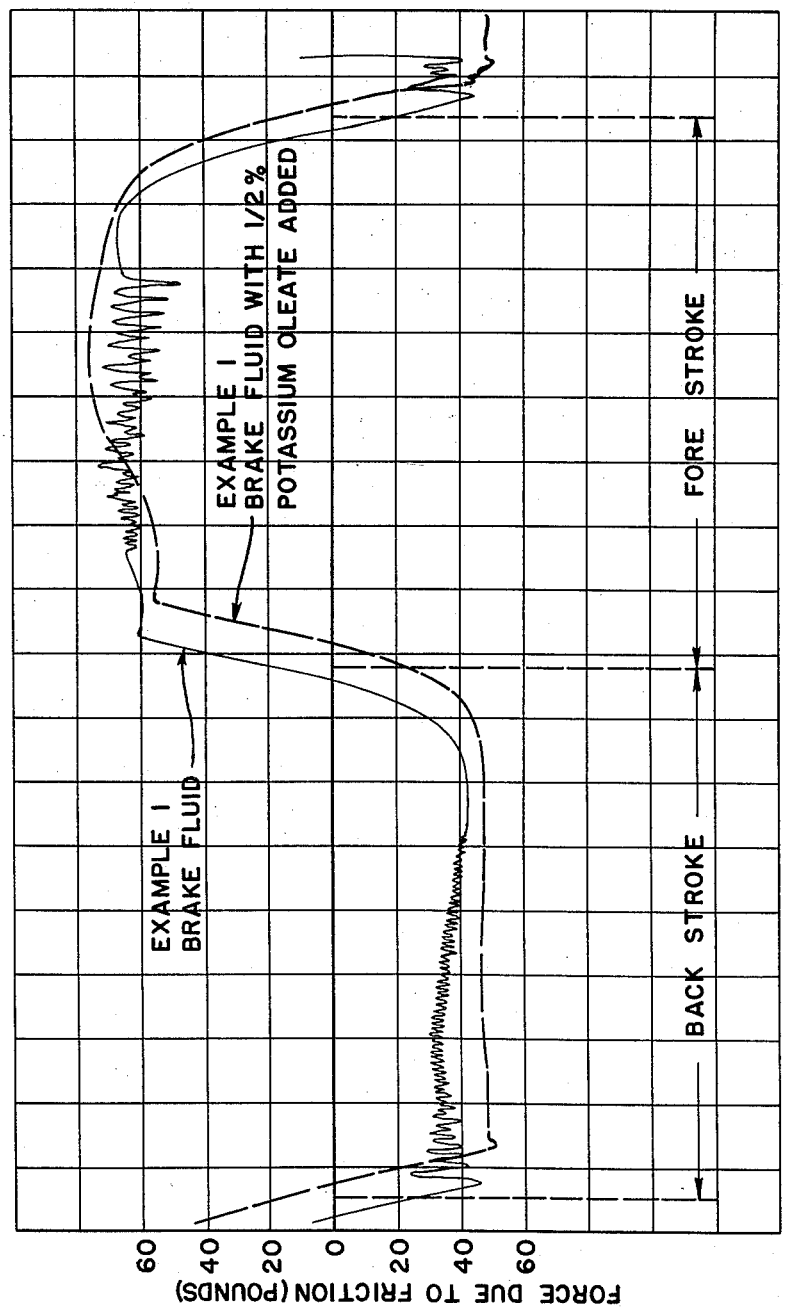

3,108,076
HYDRAULIC PRESSURE TRANSMISSION FLUID
Holle C. Luechauer, Dayton, and Paul J. Shipe, Xenia, Ohio, assignors to General Motors Corporation, Detroit, Mich., a corporation of Delaware
Filed July 27, 1960, Ser. No. 45,722
3 Claims. (Cl. 252—76)

This invention relates to hydraulic pressure transmission media and is particularly concerned with an operating fluid for use in fluid pressure operated devices wherein the fluid has a high degree of lubricity.

It is, therefore, the basic object of this invention to provide a hydraulic pressure transmission fluid for use in hydraulic systems which has a high degree of lubricity while maintaining desired viscosities within a predetermined range at extreme temperature conditions.

A further object of the invention is to provide a brake fluid for transmitting hydraulic pressures within vehicular brakes wherein a fatty acid soap is added to the fluid for improving lubricity thereof.

In carrying out the above object, it is a further object to utilize soluble fatty acid soaps as additives wherein the fatty acid portion of the soap includes 12 to 18 carbon atoms, said soap being added to the fluid in quantities of from .2% to 2% and, preferably in quantities of about ½%.

Further objects and advantages of the present invention will be apparent from the drawing and from the following description wherein preferred embodiments of the present invention are clearly shown.

In the drawing:

FIG. 1 is a chart from an X-Y plotter showing the action of a brake piston in a brake cylinder wherein the force required to move the piston is plotted against the stroke thereof utilizing a commercial brake fluid as the hydraulic medium as compared to a similar curve for the same setup using the same brake fluid with 1% of potassium oleate added.

Hydraulic pressure transmission media, such as hydraulic fluids, commonly called brake fluids in the art, are generally made up of three basic units. These comprise a base for the system which includes heavy bodied fluids such as polyglycols, castor oil, and mixtures of the aforesaid materials, diluents for controlling the viscosity of the fluid generally taken from the class consisting of glycol ethers, glycols and alcohols and an inhibitor system wherein small quantities of inhibitors are added to deter oxidation, to improve wetting and flow and to maintain the pH of the system above 7. The inhibitor system used helps preserve the components of the brake system.

It is apparent from this survey of hydraulic brake fluids that the only material in the fluid which has a lubricating effect is in the base portion thereof wherein the glycol or castor oil as the case may be, has a degree of lubricity which aids in the maintenance of free action within the braking system. In this connection the brake cylinder which controls the fluid pressure applied to the wheel brakes includes a piston which utilizes a resilient cup as a sealing means which cup slides in sealing engagement with the cylinder walls. The cup is formed from rubberlike material, usually butadiene-styrene copolymer rubber, commercially known as GRS. In many applications the lubricating effect of the base material of the brake fluid is insufficient to permit easy sliding of the cup over the cylinder walls resulting in a binding action which is represented by a chatter.

It has also been found that, in many instances, the lubricity of this system is not sufficient to prevent wear of the several parts of the system whereby replacement of certain moving parts is required periodically which wear is a direct result of the aforesaid chatter. It is not possible to add a conventional lubricant to the brake fluid without changing its characteristics since such an addition must be of appreciable volume in order to produce the desired effect. For this reason brake fluids have depended entirely on the basic constituents for lubrication which, as shown heretofore, is insufficient to prevent chatter with its attendant drawbacks.

In order to eliminate some of these problems, to increase the useful life of brake systems and to improve the operation thereof, I have found that additions, in small quantities, of specific materials such as fatty acid soaps to a brake fluid will greatly enhance the lubricating qualities thereof whereby chatter within the brake system is eliminated and a longer useful life is obtained from the parts thereof. I have found that where .2% to 2% by weight of specific fatty acid soaps is added to a brake fluid, the chatter normally present is completely eliminated and that the said addition will remain in solution under all conditions of test proceures which are greatly exaggerated over actual conditions of use.

Specifically, the addition may be made to any one of a number of brake fluids, for example, the following brake fluids are exemplary of fluids in use at the present time to which the fatty acid soap may be added:

Example 1

| | Percent |
|---|---|
| Polyglycol base | 30 |
| Diethylene glycol ethyl ether (butyl Carbitol) | 30 |
| Diethylene glycol butyl ether (Carbitol) | 30 |
| Propylene glycol | 9 |
| Inhibitors | 1 |

Example 2

| | |
|---|---|
| Polyglycol base | 20 |
| Castor oil and glycol base | 10 |
| Diethylene glycol ethyl ether | 30 |
| Diethylene glycol butyl ether | 30 |
| Propylene glycol | 4.5 |
| Ethylene glycol | 4.5 |
| Inhibitors | 1 |

Example 3

| | |
|---|---|
| Polyglycol base | 30 |
| Ethylene glycol ethyl ether | 60 |
| Hexylene glycol | 9 |
| Inhibitors | 1 |

Example 4

| | |
|---|---|
| Polyglycol base | 15.5 |
| Hexyl and amyl alcohol (50–50) | 45 |
| Hexylene glycol | 39 |
| Inhibitors | .5 |

Example 5

| | |
|---|---|
| Castor oil and glycol base | 15 |
| Hexyl and amyl alcohol (50–50) | 45 |
| Propylene glycol | 40 |

Example 6

| | |
|---|---|
| Castor oil | 30 |
| Butyl alcohol | 70 |

In the above fluids, 1 and 2 may be what is termed high boiling point fluids which meet SAE 70R3 and VVH 910 specifications. Example 3 is a moderate boiling point fluid which meets SAE specification 70R1 while Examples 4, 5 and 6 are low boiling point fluids which meet SAE specification 70R2. In all of the above formulations, the polyglycol base or castor oil or reacted castor oil is in quantities of 15% or more and this is blended with a diluent in quantities ranging from 50% to 80% by weight made up of glycols and glycol ethers or alcohols.

The polyglycol base referred to above is a reaction mixture of a glycol, such as ethylene or propylene glycol and ethylene oxide This ingredient is termed in the trade as a polyglycol. For example, ethylene glycol and ethylene oxide form polyethylene glycol having a structural formula of $HO(C_2H_4O)_N$—$C_2H_4OH$ wherein N indicates the number of ethylene oxide molecules reacted. The same reaction may be carried out with propylene glycol and propylene oxide or with ethylene oxide or combinations of oxides and glycols etc. to form more complex polyglycol bases. In the examples the polyglycol base used was a reacted mixture of one mole of ethylene glycol and one mole of ethylene oxide.

In most instances, the inhibitor such as an anti-oxidant, surface active agent, or buffer, or all three are added in small quantities not in excess of 1%.

While the aforementioned formulations are exemplary of a wide range of brake fluids, it is to be understood that other fluids coming within the broad classification can be improved in lubricity by the addition of a fatty acid soap. For example, fluids using polyglycols, and glycols, castor oil, reacted vegetable oils and castor oil, such as soy bean and corn oil, mixtures of polyglycols and castor oil may all be used as the base wherein the quantities range from 15% to 30%. The diluents may be monoalkyl glycol ethers and dialkyl glycol ethers which are reaction products of alkyl oxides and alcohols such as methyl, propyl, butyl or hexyl alcohols. Glycols such as ethylene, propylene and hexylene glycols may be used since they are of lower cost than the glycol ethers. However, they generally increase the viscosity of the fluid and, therefore, must be used in accordance with the results desired. In place of glycol ethers or glycols, the diluent may be an alcohol such as ethyl, butyl, amyl, hexyl or isopropyl alcohol, etc. However, in this instance, amyl and hexyl alcohol tend to swell rubber and, therefore, the quantity of such an alcohol used should be maintained relatively low in order of not in excess of 20%.

In all instances, however, the slipstick or chatter of a brake system utilizing any of the conventional brake fluids may be greatly improved by the addition of a fatty acid soap which definitely improves lubricity in each instance. It has been found that while quantities of from .2% to 2% are useful that a preferred figure is about .5% which will greatly improve the lubricity.

Specifically, the fatty acid soaps that are most useful are those of sodium oleate or stearate or potassium oleate or stearate. I have found, however, that soaps containing from 12 to 18 carbon atoms in the fatty acid radical portion thereof will function well. This embraces lauric, myristic, palmitic, oleic, linoleic and stearic acid soaps of potassium and sodium or in any combination. Other soluble soaps may be used.

The charts as shown in the drawings were obtained directly from a standard X-Y plotter and indicate graphically the great improvement in action of the brake when using a fatty acid soap in the fluid. In these instances all conditions were the same and the fluid used was that disclosed in Example 1. The slipstick noted by the plotter indicates chatter which results in wear and erratic brake action. Both fore and back strokes of the piston are shown.

While the embodiments of the present invention as herein disclosed constitute preferred forms, it is to be understood that other forms might be adopted.

What is claimed is as follows:

1. A hydraulic pressure transmission media comprising in combination, a base fluid including from 15% to 30% by weight of a normally liquid material taken from the class consisting of polyglycols, castor oil, and mixtures thereof, a diluent in quantities of from 50% to 80% by weight and taken from the class consisting of glycols, glycol ethers, alcohols and mixtures thereof, and a lubricity enhancing agent in quantities ranging from .2% to 2% by weight of the media and taken from the class consisting of fatty acid soaps taken from the class consisting of stearic, oleic, palmitic, lauric, myristic and linoleic soaps which are soluble in the transmission media.

2. A hydraulic pressure transmission media comprising in combination, a base fluid including from 15% to 30% by weight of a normally liquid material taken from the class consisting of polyglycols, castor oil and mixtures thereof, a diluent in quantities of from 50% to 80% by weight and taken from the class consisting of glycols, glycol ethers, alcohols and mixtures thereof, and a lubricity enhancing agent consisting of a stearic acid soap soluble in the transmission media in quantities of from .2% to 2% by weight.

3. A hydraulic pressure transmission media comprising in combination, a base fluid including from 15% to 30% by weight of a normally liquid material taken from the class consisting of polyglycols, castor oil, and mixtures thereof, a diluent in quantities of from 50% to 80% by weight and taken from the class consisting of glycols, glycol ethers, alcohols and mixtures thereof, and a lubricity enhancing agent consisting of an oleic acid soap soluble in the hydraulic media in quantities of from .2% to 2% by weight.

References Cited in the file of this patent

UNITED STATES PATENTS

| | | |
|---|---|---|
| 1,616,670 | Sherbino | Feb. 8, 1927 |
| 2,249,800 | Weber | July 22, 1941 |
| 2,751,355 | Clark | June 19, 1956 |
| 2,751,356 | White | June 19, 1956 |
| 2,947,699 | Wasson | Aug. 2, 1960 |
| 3,017,361 | Morris et al. | Jan. 16, 1962 |